United States Patent [19]

Gannett

[11] Patent Number: 4,551,838
[45] Date of Patent: Nov. 5, 1985

[54] SELF-TESTING DIGITAL CIRCUITS

[75] Inventor: Joel W. Gannett, Warren, N.J.

[73] Assignee: AT&T Bell Laboratories, Murray Hill, N.J.

[21] Appl. No.: 506,070

[22] Filed: Jun. 20, 1983

[51] Int. Cl.$^4$ .......................................... G01R 31/28
[52] U.S. Cl. .................................... 371/25; 324/73 R
[58] Field of Search ................ 371/25, 15; 324/73 R, 324/73 AT, 73 PC

[56] References Cited

U.S. PATENT DOCUMENTS

| | | | |
|---|---|---|---|
| 3,783,254 | 1/1974 | Eichelberger | 235/152 |
| 4,167,780 | 9/1979 | Hayashi | 364/200 |
| 4,225,957 | 9/1980 | Doty, Jr. et al. | 371/25 X |
| 4,298,980 | 11/1981 | Hajdu et al. | 371/25 |
| 4,320,509 | 3/1982 | Davidson | 371/25 |
| 4,340,857 | 7/1982 | Fasang | 324/73 R |
| 4,366,393 | 12/1982 | Kasuya | 307/221 R |
| 4,377,757 | 3/1983 | Konemann et al. | 307/303 |

OTHER PUBLICATIONS

Bottorf et al., Self-Testing Scheme Using Shift Register Latches, IBM Tech. Discl. Bulletin, vol. 25, No. 10, Mar. 1983, pp. 4958–4960.

Z. Barzilai et al., "Exhaustive Generation of Bit Patterns with Applications to VLSI Self-Testing," IEEE Transactions on Computers, vol. C-32, No. 2, Feb. 1983, pp. 190–194.

Primary Examiner—Charles E. Atkinson
Attorney, Agent, or Firm—David I. Caplan

[57] ABSTRACT

In order to test a digital circuit, such as a digital logic circuit (e.g., 100), for faults, during the first three cycles of a test operation of many cycles in duration, a predetermined input word is delivered to the input terminals of the logic circuit. Throughout the remaining cycles of the test operation, each output terminal of the circuit is connected by an input multiplexer (e.g., 200) to a fixed different one (or more) of the input terminals, whereby output of each cycle serves as input for the next cycle of the test operation. A counter (e.g., 300) counts the number of test operation cycles and sends an enabling signal to a signature detector (e.g., 400) when the counter counts a predetermined number of test cycles. Finally, in response to this enabling signal, each output terminal's output bit developed during the last cycle of the test operation is compared by the signature detector (e.g., 400) with the corresponding "correct" bit. Any discrepancy between any such output bit and the corresponding expected fault-free bit indicates at least one fault in the circuit.

9 Claims, 7 Drawing Figures

SELF-TESTING DIGITAL CIRCUITS

FIELD OF THE INVENTION

This invention relates to integrated circuits and more particularly to digital circuits that include testing means for detecting the presence of a fault therein, by comparing the circuit response to the expected fault-free response.

BACKGROUND OF THE INVENTION

A digital circuit is an arrangement for providing predetermined output digital signals in response to input digital signals. Such a digital circuit typically takes the form of either a digital memory circuit or a digital logic circuit. In particular, a digital memory circuit is an arrangement for storing digital data in various memory elements that can be accessed for reading in response to memory address signals. In a random access memory circuit, the stored data in any memory element can be changed in accordance with prescribed new data by electrical means. In a read only memory circuit, the stored data cannot be reversibly changed by electrical means.

On the other hand, a digital logic circuit is an arrangement, typically found in a data processing system, for processing digital input data into digital output data in accordance with prescribed logic computation rules. Such logic circuits generally fall into two classes, sequential and combinational. Sequential logic circuits contain clocked memory elements (or clocked registers) and perform their prescribed logic functions or computations in synchronism with an external clock that supplies control timing to their memory elements. Combinational logic circuits have no memory elements and do not require any clocked timing control, although ordinarily new data enters as input to a combination logic circuit on every new cycle of a clock that controls the operation of sequential logic circuits in the same data processing system. Thus, in any event, during each cycle of the clock, a logic circuit performs prescribed computation operations on the digital data in accordance with prescribed rules. The input and output data for a given cycle of the clock each takes the form of an input and an output group of bits, respectively, commonly called an input word and an output word, respectively. The output data of a given cycle can correspond to the desired result of processing the input data of that cycle (combinational logic) and/or of an earlier cycle or cycles (sequential logic).

As manufactured by conventional techniques, however, a logic circuit can have undesirable logic faults, i.e., departures of some of the actual output data words from the desired output as prescribed by the transformation rules, caused by imperfection(s) in the circuit, such as a stuck-fault (a transistor improperly always on or always off regardless of input signal).

One testing approach, one which requires no special design of the logic circuit itself to facilitate the testing, involves simply delivering a sequence of many predetermined input words (test vectors) and comparing the logic circuit's output response word for each such input word with the corresponding expected fault-free word. Any discrepancy between any bit of any such output response word and the corresponding bit of the corresponding expected word indicates the presence of at least one logical fault in the logic circuit. A major disadvantage of this approach is the added cost of extra hardware needed and the added operating time required to generate and store the required test vectors and to deliver them sequentially to the logic circuit, as well as the added cost in operating time required to compare sequentially every one of the output words with the corresponding one of the expected words. The latter disadvantage is especially acute since the required number of such test vectors typically is of the order of hundreds or thousands in order to assure a reasonably high probability (typically at least 80%) of detecting a fault in the logic circuit, i.e., to assure reasonably good fault detection coverage.

In prior Art, therefore, various approaches have been proposed for specially designing logic circuits themselves in such a manner as to facilitate testing to detect the presence of logic faults therein. In general, these approaches involve designing the circuit to render a relatively large number of internal circuit nodes directly accessible for testing, while adding only a few, if any, additional external access terminals or pins to the circuit, as explained in greater detail, for example, in U.S. Pat. No. 4,320,509, entitled "LSI Circuit Logic Structure Including Data Compression Circuitry," by R. P. Davidson, dated Mar. 16, 1982.

In particular, U.S. Pat. No. 3,783,254, issued to E. B. Eichelberger on Jan. 1, 1974, entitled "Level Sensitive Logic System," teaches a logic circuit that can be placed in a test mode in which all latches associated with selected internal nodes are configured into one or more serial shift registers from which data can be serially shifted out of the latches for readout and comparison with the expected fault-free response. An important disadvantage of this approach is that it does not test the circuit at its full rated operating speed, so that high frequency (a.c.) faults may not be detected. Also, testing in accordance with this approach is undesirably time-consuming, because of the need to examine a relatively long output bit stream on a bit-by-bit basis.

Another illustrative approach to improve testability involves generation of a signature word of one or more bits in length by sampling the parity signals present at one or more given internal nodes at different times during operation and arithmetically adding the parity signals together for each node to form a timecompressed parity bit for each node. Such an approach is described, for example, in the aforementioned U.S. Pat. No. 4,320,509. Any discrepancy between the resulting signature word formed by the string of such compressed parity bits for each node and the expected fault-free signature word supplies the desired error information concerning the data on each of the internal nodes. Important disadvantages of this approach are that it requires an undesirably large number of additional access terminals and that testing of the added test circuitry itself for its own errors is not easily accomplished.

Moreover, similar and further problems arise in the testing of digital memory circuits. In such memory circuits, generally, pattern dependent faults may occur; that is, an error in a given storage element does or does not occur depending upon the instantaneous pattern of data then stored in other elements of the memory. Hence, testing memory circuits for faults generally presents a problem that is of even greater complexity than testing for faults in logic circuits of similar size.

It would therefore be desirable to have a means for reasonably good fault detection coverage of a digital circuit that mitigates the problems of the prior art.

SUMMARY OF THE INVENTION

This invention is based upon the discovery that reasonably good fault detection coverage probability ("fault coverage") for a digital circuit, such as a digital logic circuit, can be provided by feedback means for performing a test operation of many cycles (typically about 250 such cycles for a multiplier logic circuit capable of multiplying a pair of 16 bit numbers) during which the digital circuit's output of each cycle is fed back as the digital circuit's input for the next succeeding cycle. During the initial cycles of the test operation, input to the digital circuit is a predetermined word and during the final cycle of the test operation the digital circuit's output word is compared with the predetermined expected (fault-free) output word. Any discrepancy between any bit of the digital circuit's output word during the final cycle of the test operation and the corresponding bit of the expected output word indicates at least one fault in the digital circuit. The digital circuit can take the form of either a memory circuit or a logic circuit.

Thus, in accordance with an embodiment of the invention, a digital circuit, having data input terminals for receiving input data words and data output terminals for delivering output data words, is provided with an input multiplexer which, during each cycle of normal operation, enables a normal data input word to flow as input into the data input terminals of the digital circuit and which, during the initial cycle (or cycles) of a test operation, enables a predetermined test input data word (or words) to flow as input to the data input terminals of the digital circuit, the input multiplexer being connected through a feedback data processor to the data output terminals of the digital circuit such that, during the test operation, but after the initial cycles mentioned above, output data delivered by the data output terminals of the digital circuit are fed back through the feedback processor as the test input data to the data input terminals of the digital circuit. Advantageously, there is further provided a signature detector connected to receive and detect the output data word of the digital circuit and to compare, during a predetermined cycle of the test operation, each bit of the output word data of the digital circuit with a corresponding bit of the expected output data, whereby the signature detector generates an affirmative signature detector output signal if and only if each bit of the digital circuit's output data word during the predetermined cycle of the test operation is equal to the corresponding bit of the predetermined expected output data word.

In a specific embodiment of the invention, the logic circuit takes the form of a multiplier logic circuit for calculating the arithmetic product of two input binary numbers, each in the form of an input word having n bits and representing in 2's complement binary notation the respective input binary number. By "2's complement" is meant that the most significant bit has a weight of $-2^{n-1}$ rather than $2^{n-1}$ as in ordinary binary notation, and that the remaining bits have the same weight as in ordinary binary notation. The multiplier circuit has a plurality of output terminals, n in number; that is, each output word has n bits. The multiplier circuit also has a different plurality (2n+1) of input terminals: one set of n input terminals for receiving one of the binary numbers (multiplicand) as input data, another set of n input terminals for receiving the other of the binary numbers (multiplier) as input data, and one input control terminal for receiving a High Order control signal. This High Order control signal selects for delivery at the multiplier circuit's output terminals as between the first (most significant) n bits and the second (least significant) n bits of the arithmetic product in 2's complement binary notation, as computed by the multiplier logic circuit. An input multiplexer is arranged to deliver input data to the logic circuit, so that during normal computation operation of the multiplier circuit the one group of input terminals of the multiplier circuit receives, from the chip primary inputs, one of the binary numbers, the other group receives the other of the binary numbers, and the one input control terminal receives the High Order control signal. The input multiplexer is further arranged so that, during a test operation of many cycles (typically about equal in number to the number of test vectors that would be required for the same fault detection probability) of the multiplier circuit, the n bits of output of the multiplier circuit during each cycle is fed back with predetermined fan-out to become the 2n+1 bits of input to the circuit for the next succeeding cycle. However, during the initial first three cycles of the test operation, a predetermined input word is supplied through the multiplexer to the 2n+1 input terminals of the multiplier circuit. After about $2^k$ cycles, the test operation undergoes its final cycle, and a signature detector is then enabled by a counter of the cycles, whereby the logic circuit's output word at that moment of time is compared bit-by-bit with the correct output word, i.e., the expected fault-free value of the desired arithmetic product (of the multiplicand and the multiplier) in binary notation. If and only if every bit of the logic circuit's output word then agrees with the corresponding bit of the expected word, an affirmative signature detector output signal (of one bit) is then latched into an output latch to indicate the absence of detection of any logical faults in the multiplier circuit and thus the probable actual absence of any such faults.

BRIEF DESCRIPTION OF THE DRAWING

This invention together with its features, advantages, and characteristics may be better understood from the following detailed description when read in conjunction with the drawing in which.

DETAILED DESCRIPTION

Figure 1:
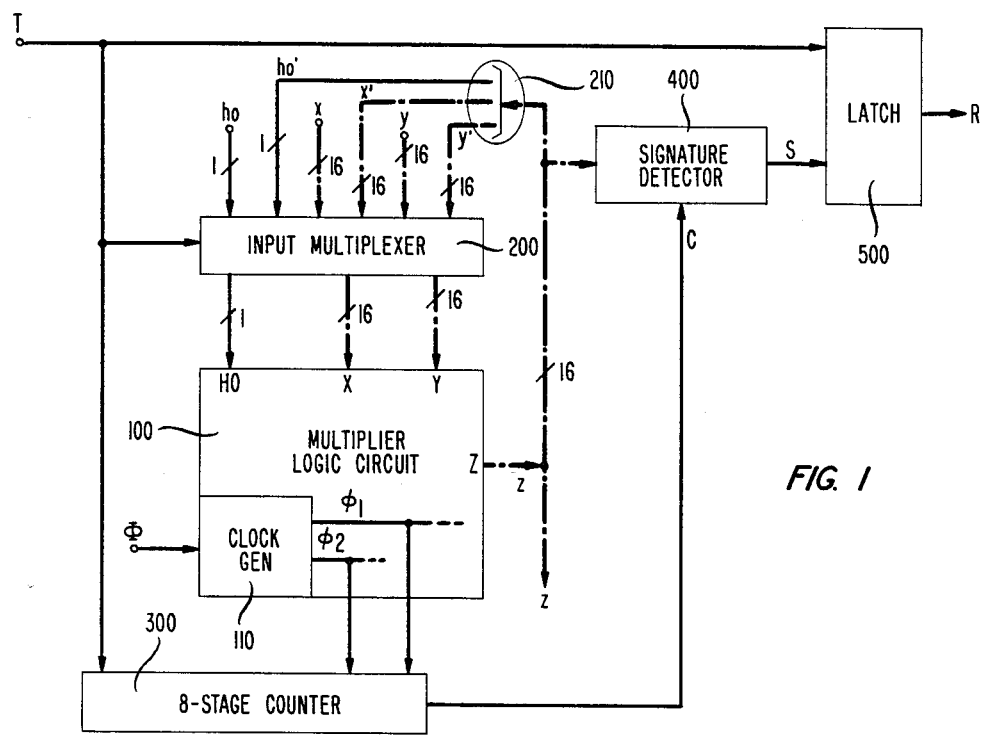
FIG. 1 is a schematic diagram of a multiplier logic circuit with testing means in accordance with a specific embodiment of the invention.

As shown in FIG. 1, a multiplier circuit with testing means in accordance with a specific embodiment of the invention comprises a multiplier logic circuit 100 including a clock generator 110, an input multiplexer 200, feedback processor means 210, an 8-stage binary counter 300, a signature detector 400, and an output latch 500. The multiplexer 200 selects, in response to a binary test operation command signal T, for delivery to the input terminals HO, X, and Y of the multiplier circuit 100 as between inputs ho and ho', inputs x and x', and y and y', respectively, as more fully described below. The multiplier logic circuit 100 is arranged to receive input at first and second groups of data input terminals X and Y, respectively. An external clock pulse sequence $\phi$ drives a clock generator 110 which supplies no noverlapping phase clock sequences $\phi_1$ and $\phi_2$ in response to an external clock signal $\Phi$, in order to control the timing of operation of the logic circuit 100 as known in the art.

Illustratively, the multiplier-logic circuit 100 has sixteen input terminals in the first group X and sixteen in the second group Y. During each (clock) cycle of operation, the first group of input terminals $X = (X_0, X_1, X_2, \ldots X_{15})$ receives a first input data word $x = (x_0, x_1, x_2, \ldots x_{15})$ and the second group of input terminals $Y = (Y_0, Y_1, \ldots Y_{15})$ receives a second input data word $y = (y_0, y_1, y_2, \ldots y_{15})$. That is to say, input terminal $X_0$ receives $x_0$; $X_1$ receives $x_1, \ldots$; $X_{15}$ receives $x_{15}$; $Y_0$ receives $y_0$; $Y_1$ receives $y_1, \ldots$; and $Y_{15}$ receives $y_{15}$. Both these words, x and y, thus contain sixteen bits each, and each word can be considered as representing a sixteen digit number in binary notation—advantageously in 2's complement form for representing positive and negative numbers, as known in the art.

The purpose of the multiplier circuit 100 is to produce during normal operation an output word $z = (z_0, z_1, z_2, \ldots z_{15})$, representing in binary notation in 2's complement form the arithmetic product $z = xy$ of the first and second input words considered as sixteen digit binary numbers. The first input word x is thus the "multiplicand"; and the second y, the "multiplier." There are, however, only sixteen output terminals Z, so that the multiplier circuit 100 can produce an output word z of only sixteen bits in length, that is, a number in binary notation containing only sixteen digits. Thus, since the arithmetic product z (in 2's complement form) has thirty-one digits, $z = (z_0, z_1, z_2, \ldots z_{30})$, the output z can represent, at any moment of time, only a (one-half) portion of the desired arithmetic product. Accordingly, the multiplier circuit 100 contains a High Order selection input terminal HO arranged to receive a High Order selection signal ho, so that when a binary 0, for example, is received by this terminal HO, then the output z displays the sixteen most significant bits of the arithmetic product $z = xy$ (with $z_{15} = z_{30}$, the sign bit); and when a binary 1 is received by HO, then the output z displays the fifteen least significant bits of the product $z = xy$ (except that again $z_{15} = z_{30}$). For testing purposes, as indicated in FIG. 1, the circuit 100 is supplied with the input multiplexer 200 (FIG. 2), the fan-out feedback means 210, the 8-stage binary counter 300 which counts to 255 ($= 2^8 - 1$), the signature detector 400 (FIG. 3), and the output latch 500 (FIG. 4)—all responsive to the binary test operation command signal T. When $T = 1$, i.e., binary logic HIGH, then the system illustrated in FIG. 1 performs normal operation cycles, when $T = 0$, logic LOW, the system performs test operation cycles as more fully explained below.

It should be understood that the logic circuit 100—together with the multiplexer 200, the feedback means 210, the counter 300, the signature detector 400, and the output latch 500—can all take the form of semiconductor circuits integrated in a single chip of semiconductive silicon. During normal operation ($T = 1$), the input multiplexer 200 delivers to the input terminals HO, X, and Y of the multiplier circuit 100, respectively, an input High Order binary selection signal ho, the first input data word x, and the second input data word y. The output terminals Z then deliver an output word z, representative of the product xy, to utilization means (not shown). During this normal operation, the counter 300 does not perform any counting function.

During each cycle of test operation ($T = 0$), the input multiplexer 200 delivers—to the input terminals HO, X, and Y—feedback data ho', x', and y' that are derived from the output data $z = (z_0, z_1, \ldots z_{15})$, as received from the output terminals Z, through the fan-out feedback means 210 in accordance with the following table:

| Output | Feeds Back to Input Terminal(s) |
|---|---|
| $z_0$ | HO, $X_7$, $Y_{13}$ |
| $z_1$ | $X_2$, $Y_{11}$ |
| $z_2$ | $X_{12}$, $Y_3$ |
| $z_3$ | $X_8$, $Y_5$ |
| $z_4$ | $X_4$, $Y_{12}$ |
| $z_5$ | $X_{10}$, $Y_6$ |
| $z_6$ | $X_{15}$, $Y_2$ |
| $z_7$ | $X_0$, $Y_9$, $Y_{10}$ |
| $z_8$ | $X_3$, $Y_1$ |
| $z_9$ | $X_{13}$, $Y_8$ |
| $z_{10}$ | $X_{11}$, $Y_7$ |
| $z_{11}$ | $X_6$, $Y_4$ |
| $z_{12}$ | $X_1$, $Y_{14}$ |
| $z_{13}$ | $X_{14}$, $Y_0$ |
| $z_{14}$ | $X_9$, $Y_{15}$ |
| $z_{15}$ | $X_5$ |

Figure 5:
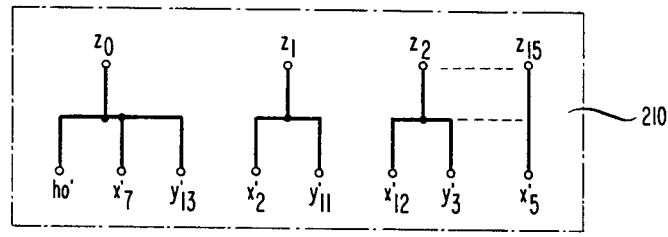
FIG. 5 is a schematic of a feedback processor means useful in the practice of the invention.

Thus $z_0 = ho' = x_7' = y_{13}'$, $z_1 = x_2' = y_{11}'$, $\ldots$, $z_{15} = x_5'$, where the primed variables denote feedback signals from the output terminals Z of the multiplier circuit 100. During test operation, therefore, the multiplexer 200 delivers ho' to the input terminal HO of the multiplier, x' to X, and y' to Y, i.e., $x_0'$ to $X_0$, $x_1'$ to $X_1, \ldots, x_{15}'$ to $X_{15}$, $y_0'$ to $Y_0$, $y_1'$ to $Y_1, \ldots,$ and $y_{15}'$ to $Y_{15}$. Thus the feedback processor means 210, as illustrated in FIG. 5, simply can take the form of fan-out wiring, with a fan-out of one-to-two (except for one-to-three for $z_0$ and $z_7$, and one-to-one for $z_{15}$). Thus, input data to HO, X, and Y during each cycle of test operation (except for the initial three cycles) is a fan-out representation, in accordance with the table, of the output data z of the immediately previous test cycle.

For the initial three cycles of test operation, the input multiplexer 200 is arranged to deliver to the input terminals HO, X, and Y a preselected initialization input word, illustratively ho $= 0$, $x = (0, 0, 0, 0, 0, 0, 1, 1, 0, 1, 1, 1, 0, 1, 1, 1)$, and $y = (0, 1, 1, 1, 1, 0, 1, 1, 1, 0, 0, 0, 1, 0, 1, 0)$, as described in greater detail below. This initializing word, and the particular feedback fan-outs as in the table above, were obtained by trial and error and have been found to furnish good (over 95%) fault detection coverage during the test operation (of 255 cycles) being described.

After the initial three cycles of test operation, the feedback means 210 delivers a fan-out representation of the output z of the immediately preceding cycle to the input multiplexer 200 which, in turn, delivers this fan-out representation to the input terminals HO, X, and Y. Meanwhile, the 8-stage counter in response to the test operation command signal $T = 0$ counts the number of such test cycles up to $2^8-1=255$ cycles and then delivers an enabling counter output signal ($C=1$) to the signature detector 400. In response to this enabling signal, the signature detector compares each bit of the 16-bit output word z of the final (255th) test operation cycle with the corresponding expected (fault-free) value as determined, for example, by simulation on the logic simulator previously used for designing and testing the multiplier logic. If and only if no discrepancy is then found—that is, if each bit of the output word z agrees with the corresponding bit of the expected output word—then the signature detector 400 delivers an affirmation (pulsed) signature detector output signal $S=1$ to the latch 500; otherwise, $S=0$. The latch 500 then delivers an affirmative test result signal $R=1$ continuing for so long as the test command signal T continues to correspond to test operation ($T=0$). When normal operation is resumed ($T=1$), the latch 500 is reset, so the test result signal R goes back to $R=0$, and the counter 300 is also reset to 0.

Note that only two additional input/output pins—one each for T and R—are required to implement this self-testing scheme.

Although the selection of the feedback fan-outs and the initialization input word has to be done by trial and error, a few general principles are available to guide the selection process. The feedback should be selected so that output words z do not repeat during the test operation cycles, and so that during test cycles the bit string of each xy product word is substantially not correlated with the bit string in the output z which generated this product xy by feedback.

It has been found by computer simulation that, when the multiplier circuit is tested in accordance with the invention using a given number of cycles of test operation, the resulting fault detection coverage is approximately the same as that which is obtainable from the same given number of randomly generated test vectors of prior art; however, the invention has the advantage of less hardware and/or less time required for testing. Moreover, since test operation in accordance with the invention can be performed at the same speed of operation as that of normal circuit operation, testing in accordance with the invention can also detect dynamic faults (i.e., faults that occur only at speeds at least as high as those of normal operation), as well as static faults.

The initialization and carrying out of the test operation can be achieved as follows: First, stop the clock sequence $\Phi$ at its low value; then set $h_0=0$, i.e., set HO to ground potential. Next, set $x_0, x_1, \ldots x_{15}$ and $y_0, y_1, \ldots y_{15}$ to their predetermined initializing values. Then, set $T=1$. At this time if $R=1$, the test circuit itself is faulty and the test should be terminated. If then $R=0$, next apply three or more low-to-high transitions to the clock generator 110, in order to initialize all the internal registers of the multiplier circuit. Next, turn off the clock $\Phi$ so that test operation cycles automatically are performed by the logic circuit 100. After 255 cycles of the clock $\Phi$, counting from the time when T was set to 0, the output R (which was reset to $R=0$ when $T=1$) should go to $R=1$ if the circuit is functioning properly.

Figure 2:
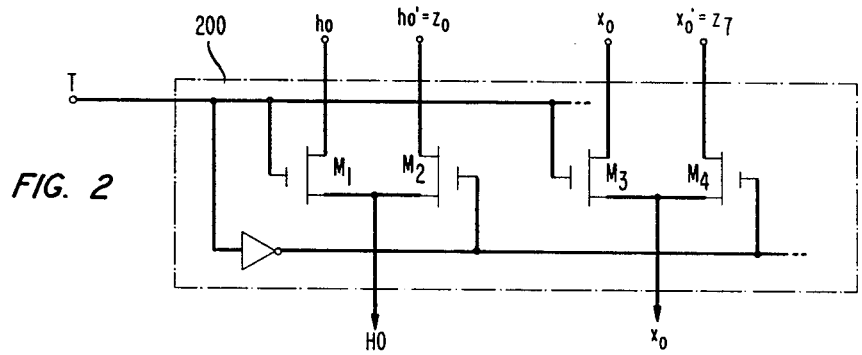
FIG. 2 is a schematic diagram of an illustrative embodiment of an input multiplexer useful in the practice of the invention.

FIG. 2 depicts an illustrative embodiment of the input multiplexer 200. This multiplexer is advantageously built in MOS (metal oxide semiconductor) technology and comprises mutually parallel switching transistors $M_1$ and $M_2$ for providing input data to the terminal HO, $M_3$ and $M_4$ for providing input to the terminals $X_0$, and so forth. The gate electrodes of transistors $M_1$ and $M_3$ are connected to receive the test command signal T, while the gate electrodes of $M_2$ and $M_4$ are connected to receive the logical complement of T through an inverter I. Thus when $T=0$, $M_1$ and $M_3$ are off, while $M_2$ and $M_4$ are on; and when $T=1$, $M_1$ and $M_3$ are on, while $M_2$ and $M_4$ are off. Thus when $T=0$, the signal $z_0$ is delivered by the multiplexer 200 to terminal HO and the signal $z_7$ to the terminal $X_0$; and when $T=1$, the signal $h_0$ is delivered to HO, the signal $x_0$ to $x_0$.

Figure 3:
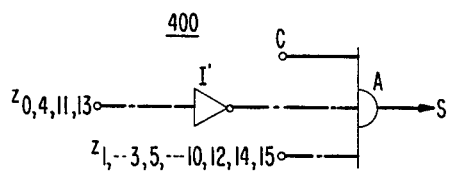
FIG. 3 is a schematic drawing of an illustrative embodiment of a signature detector useful in the practice of the invention.

FIG. 3 depicts an illustrative embodiment of the signature detector 300. This detector comprises a 17-input terminal AND gate A. To one of this gate's 17-output terminals is delivered the enabling signal C from the counter, to each of another 4 of its 17-input terminals is delivered the outputs $z_0, z_4, z_{11},$ and $z_{13}$ from the logic circuit 100 through an inverter array I', so that the logical complement of each of $z_0, z_4, z_{11},$ and $z_{13}$ is thereby delivered to a separate one of each of the 4 terminals, and to each of the remaining twelve input terminals of the AND gate A is delivered a separate one of the remaining twelve outputs ($z_1, z_2, z_3, z_5, z_6, z_7, z_8, z_9, z_{10}, z_{12}, z_{14}, z_{15}$) from the logic circuit 100. Thus if and only if $C=1$ and simultaneously the word $z=(z_0, z_1, \ldots z_{15})$ is equal to the expected faultfree value (0, 1, 1, 1, 0, 1, 1, 1, 1, 1, 1, 0, 1, 0, 1, 1), then the output S of the AND gate A will be $S=1$; otherwise $S=0$. Thus, the detector 300 shown in FIG. 3 functions as the desired signature detector.

Figure 4:
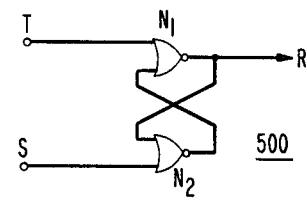
FIG. 4 is a schematic drawing of an illustrative embodiment of an output latch useful in the practice of the invention.

FIG. 4 depicts an illustrative embodiment of a logic diagram of the latch 500. This latch comprises a pair of cross-coupled NOR gates $N_1$ and $N_2$. The test command signal T is delivered as an input to $N_1$, and the signature output signal S is delivered as an input to $N_2$. The test result signal output R of the latch 500 goes from logic low ($R=0$) to logic high ($R=1$) when and only when /S goes high at a time when T Is low ($S=1$ while $T=0$) and thereafter this test result signal R remains high ($R=1$) after S goes back to logic low ($S=0$) for so long a time as T remains low ($T=0$); but when T goes high ($T=1$), the test result signal R goes low ($R=0$). Thus, only during a test operation ($T=0$) can the latch 500 go high ($R=1$), that is, when S goes high, and the test result R of the latch 500 remains high ($R=1$) for the entire remainder of the test operation regardless of further changes S, just as desired for latching the output signature signal S of the signature detector 400.

Figure 6:
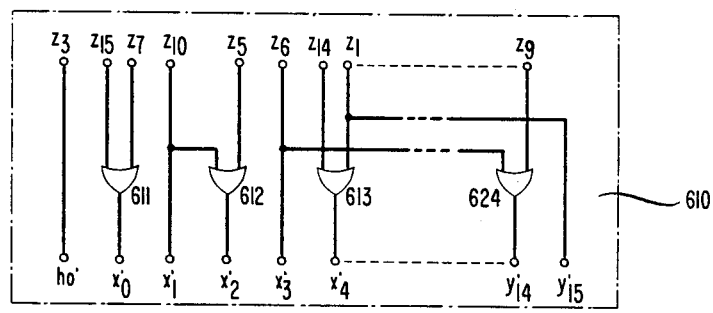
FIG. 6 is a schematic of another feedback processor means useful in the practice of the invention.
Figure 7:
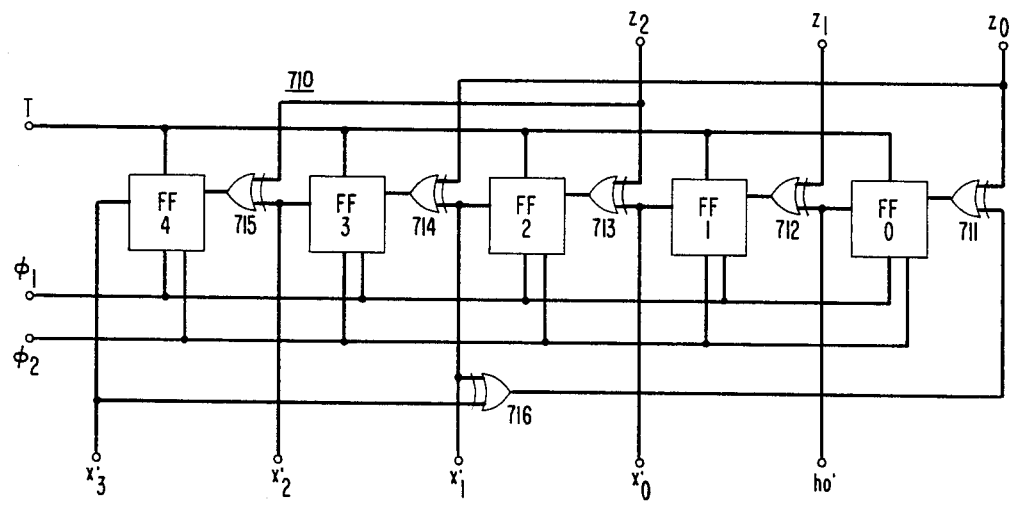
FIG. 7 is a schematic of still another feedback processor means useful in the practice of the invention.

It should be noted that the simple fan-out type of feedback processor means 210 shown in FIG. 5 has the property that two (or more) signal outputs of the processor will be mutually equal throughout the test operation. Thus, for example, throughout test operation, constraints are imposed upon the output signals delivered by the input multiplexer 200 as input signals to the multiplier logic circuit 100, to wit, $h_0'=x_7'=y_{13}'$, $x_2'=y_{11}'$, etc. Such constraints on the inputs can be an undesirable limitation upon the scope of the test operation. To avoid such constraints, other feedback processor means 610 and 710 can be used, such as illustrated in FIGS. 6 and 7, respectively. The resulting feedbacks no longer are in accordance with the previous table. More specifically, the feedback processor means 610 (FIG. 6) uses OR gates 611, 612, 613 . . . 624, in order to remove the constraints by destroying identities and introducing inequalities of signals among $h_0', x_7',$ and $y_{13}'$, among $x_2'$ and $y_{11}'$, among $x_{12}'$ and $y_3'$, etc. Preferably the OR gates are arranged so that none of the $z_i$ feeds more than three such OR gates, and most of the $z_i$ feed only two OR gates. Alternatively, the feedback processor means 710 (FIG. 7) uses a linear feedback shift register (clocked flip-flops $FF_0$, $FF_1$, $FF_2$, etc.) with exclusive OR gates 711, 712, 713, etc., not only to remove the constraints but also to produce pseudorandomization of the outputs x' and y' relative to the inputs z.

Although the invention has been described in detail in terms of a specific embodiment, various modifications can be made without departing from the scope of the invention. For example, the logic circuit 100 can be virtually any type of logic circuit instead of a multiplier, such as any combinational logic circuit in which the feedback path added in accordance with the invention contains memory delay elements typically in the form of a linear feedback shift register (FIG. 7), in order to delay the feedback and prevent an undesirable "race around" condition. Moreover, the invention can also be used in sequential logic circuits having data storage elements (registers) such that the output data of a given cycle are completely determined by the input data for a fixed number N of earlier cycles of operation. In the case of such logic circuits, initializing of the data storage elements is done according to the invention, by supplying the logic circuit with one or more preselected initialization words, one of such words supplied to the logic circuit as input during each of N+1 successive initialization cycles. It should be understood, of course, that the selection of initialization word(s), number of test cycles, and details of feedback connections will vary with different logic circuits, to obtain reasonably good fault coverage in accordance with the invention.

This invention can advantageously also be used for designing for testing any digital circuit having inputs and outputs, such as random access memories and read only memories. In the case of testing such a designed random access memory circuit, after initializing the memory with predetermined data, a feedback processor delivers feedback signals, during many successive memory cycles, to an input multiplexer which, in turn, delivers signals both to memory address lines (connected as input lines during testing) and to memory data input lines, in similar fashion as for the input lines of the above described logic circuit. A read only memory circuit can be tested by a similar arrangement except that there are then only address lines (connected as input lines during testing) but there are no data input lines.

What is claimed is:

1. A logic circuit comprising:
   (a) a digital circuit having a first plurality of input terminals for receiving input digital signals to the digital circuit during each cycle of circuit operation and a seond plurality of output terminals for delivering output digital signals from the digital circuit during each such cycle;
   (b) input multiplexer means connected for receiving both normal input digital signals and test signals derived from the output signals by means of a signal processor which receives the output signals and for delivering to the input terminals of the digital circuit the normal input signals during each cycle of normal circuit operation and for delivering to the input terminals of the digital circuit the test signals during each cycle of a test operation havng a plurality of cycles for detecting faults in the digital circuit.

2. The logic circuit of claim 1 further comprising a signature detector arranged for comparing the output signals of the digital circuit delivered during the final cycle of the test operation and for developing a signature detector output signal indicative of the absence of any discrepancy between any bit of the output of the digital circuit and the corresponding bit of the expected output of the test operation.

3. The logic circuit of claim 2 further comprising a counter, connected both to a clock signal generator which determines the timing of each such cycle of operation and to the signature detector, for counting the number of cycles during the test operation and for delivering during the final cycle of the test operation an enabling signal to the signature detector in order to enable the signature detector to develop the signature detector output signal.

4. The logic circuit of claim 3 further comprising an output latch, connected to the signature detector, for receiving and storing the signature detector output signal.

5. An integrated circuit comprising
   (a) a digital circuit having a first plurality of data input terminals and a second plurality of data output terminals, the circuit adapted to be controlled by a clock cycle of operation;
   (b) an input multiplexer having first and second groups of input terminals, each group in number equal to the first plurality, the first group for receiving normal input data and the second group for receiving test input data;
   (c) feedback processor means, connected to the output terminals of the digital circuit and to the second group of input terminals of the multiplexer, for receiving output data from the data output terminals of the digital circuit, processing the output data into the test input data, and for delivering the test input data to the second group of input terminals of the multiplexer, the multiplexer being responsive to a test operation command signal whereby when the test operation command signal is a first value the multiplexer connects each of its second group of input terminals to a separate one of the input terminals of the digital circuit in order to deliver the test input data to the input terminals of the digital circuit, and whereby when the command signal is a second value the multiplexer connects each of its first group of input terminals to separate one of the input terminals of the digital circuit in order to deliver the normal input data to the input terminals of the digital circuit; and
   (d) signature detector means, connected to the output terminals of the digital circuit, for developing a positive signature detector output signal, in response to a test operation cycle counter signal developed by a counter which is connected to a clock signal generator and which counts the number of cycles of operation of the digital circuit during test operation, if and only if there is no discrepancy between the output data of the output terminals of the digital circuit and the expected output word.

6. The integrated circuit of claim 5 including the counter, for generating the test operation cycle counter signal.

7. The combination of claim 6 in which the digital circuit is essentially a multiplier circuit for delivering output data representative of the arithmetic product of first and second binary numbers corresponding to a pair of numerical equivalents of the input data received by the data input terminals of the multiplier circuit.

8. The integrated circuit of claim 5 in which the digital circuit is essentially a multiplier circuit for delivering output data representative of the arithmetic product of first and second binary numbers corresponding to a pair of numerical equivalents of the input data received by the data input terminals of the multiplier circuit.

9. A logic circuit comprising:
(a) a digital circuit connected for receiving and processing input signals into output signals; and
(b) means, connected for receiving both normal data and the output signals, for delivering, as the input signals to the digital circuit, the normal data during normal operation of the digital circuit and test data during test operation of the digital circuit, the test data being derived from the output signals by means of a signal processor which receives the output signals.

* * * * *

UNITED STATES PATENT AND TRADEMARK OFFICE
CERTIFICATE OF CORRECTION

PATENT NO.  : 4,551,838

DATED       : November 5, 1985

INVENTOR(S) : Joel W. Gannett

It is certified that error appears in the above-identified patent and that said Letters Patent is hereby corrected as shown below:

Column 1, line 37, "combination" should read --combinational--. Column 4, line 18, "ofthe" should read --of the--. Column 5, line 12, "no noverlapping" should read --nonoverlapping--. Column 7, line 57, "clock $\Phi$ so that" should read --clock $\Phi$, set T=0, and then turn on the clock $\Phi$ so that--. Column 8, line 9, "$x_0$ to $x_0$" should read --$x_0$ to $X_0$--. Column 8, line 12, "output" should read --input--. Column 8, line 36, "'S" should read --S--; and "Is" should read --is--.

Signed and Sealed this

Twenty-fifth Day of March 1986

[SEAL]

Attest:

DONALD J. QUIGG

Attesting Officer

Commissioner of Patents and Trademarks